United States Patent [19]

Kinsky

[11] Patent Number: 4,800,501
[45] Date of Patent: Jan. 24, 1989

[54] VEHICLE LAND NAVIGATING DEVICE
[76] Inventor: Ivan Kinsky, 23601 Draco Way, Canoga Park, Calif. 91307
[21] Appl. No.: 933,807
[22] Filed: Nov. 24, 1986
[51] Int. Cl.⁴ .................... G06G 7/78; G01C 19/38
[52] U.S. Cl. .................... 364/453; 364/457; 364/571.01; 33/320
[58] Field of Search ............ 364/571, 565, 566, 453, 364/443, 454; 33/316, 320, 324, 326, 328; 73/178 R, 504

[56] References Cited

U.S. PATENT DOCUMENTS

| | | | |
|---|---|---|---|
| 3,699,316 | 10/1972 | Lopes, Jr. | 364/453 |
| 4,317,174 | 2/1982 | Dean | 364/432 |
| 4,321,678 | 3/1982 | Krogmann | 364/453 |
| 4,347,573 | 8/1982 | Friedland | 364/453 |
| 4,418,306 | 11/1983 | Samsel | 318/648 |
| 4,507,737 | 3/1985 | La Sarge et al. | 364/453 |
| 4,512,086 | 4/1985 | Galuschak et al. | 33/324 |
| 4,530,237 | 7/1985 | Barriae | 73/178 R |
| 4,583,178 | 4/1986 | Ameen et al. | 364/453 |

Primary Examiner—Gary Chin
Assistant Examiner—Thomas G. Black
Attorney, Agent, or Firm—Drucker & Sommers

[57] ABSTRACT

A device is provided for enabling inertial land navigation of a vehicle, for measuring and updating vehicle heading by North-seeking and navigating. A single dual-axis gyroscope is sequenced through North-seeking, parameter calibration, and navigating by a high resolution flip table rotated by a stepper motor, without a gimballed support therefor. Inclinometers aid the gyroscope in North-seeking and parameter calibration without accelerometers therefor.

8 Claims, 4 Drawing Sheets

VEHICLE LAND NAVIGATING DEVICE

BACKGROUND OF THE INVENTION

The invention relates generally to an inertial land navigation system, and relates specifically to a vehicle land navigating device for measuring and updating vehicle heading by North-seeking and navigating.

It has been known in the art to provide inertial land navigators which include gimballed gyroscope suspensions and/or accelerometers.

In U. S. Pat. No. 4,321,678, the vehicle positioning apparatus includes a plurality of gimbals associated with torquers and angle-measuring devices for suspending the two-axes gyroscope, a plurality of accelerometers for assisting direction-finding thereby, and magnetic sensors. In U.S. Pat. No. 4,347,573, the land-vehicle navigation system includes three single-axis gyroscopes strapped down to the vehicle for land navigation.

In U.S. Pat. No. 4,507,737, the heading reference and land navigation system includes a two-axis gyroscope, assisted by two accelerometers, providing limited attitude in North seeking. In U.S. Pat. No. 4,512,086, the heading indicator includes a two-axis gyroscope with a gimbal support, providing limited attitude in inclination.

In U. S. Pat. No. 4,530,237, the gyroscopic navigational installation system includes two gyroscopes, one gimbal support therefor, and two accelerometers for aiding vehicle navigation. In U.S. Pat. No. 4,583,178, the vehicle strapped-down inertial system includes a pair of gyroscopes, a pair of accelerometers, and gimbals.

However, such systems are very expensive, particularly in view of such gimbals and accelerometers.

SUMMARY OF THE INVENTION

The device of the invention is adapted to overcome the above problems associated with the prior art, as well as others.

It is adapted to enable inertial land navigation of a vehicle, for measuring and updating vehicle heading by North-seeking and navigating, without gimbals or accelerometers, in a highly economical and efficient manner, comparable in performance to high cost systems which include gimbals and/or accelerometers.

It includes a high resolution rotatable flip table and stepper motor therefor, adapted to support and sequence a single dual-axis gyroscope through the positions required for North-seeking, parameter calibrating, and navigating, which is turned during North-seeking, and fixed during navigation.

It further includes inclinometers, for assisting the single dual-axis gyroscope in North-seeking and parameter calibrating.

DESCRIPTION OF THE PREFERRED EMBODIMENTS

The device of the invention, as shown in FIGS. 1-5 and as described herein, comprises a vehicle land navigating device 10, adapted to measure and update the vehicle heading by seeking North and navigating.

Figure 1:
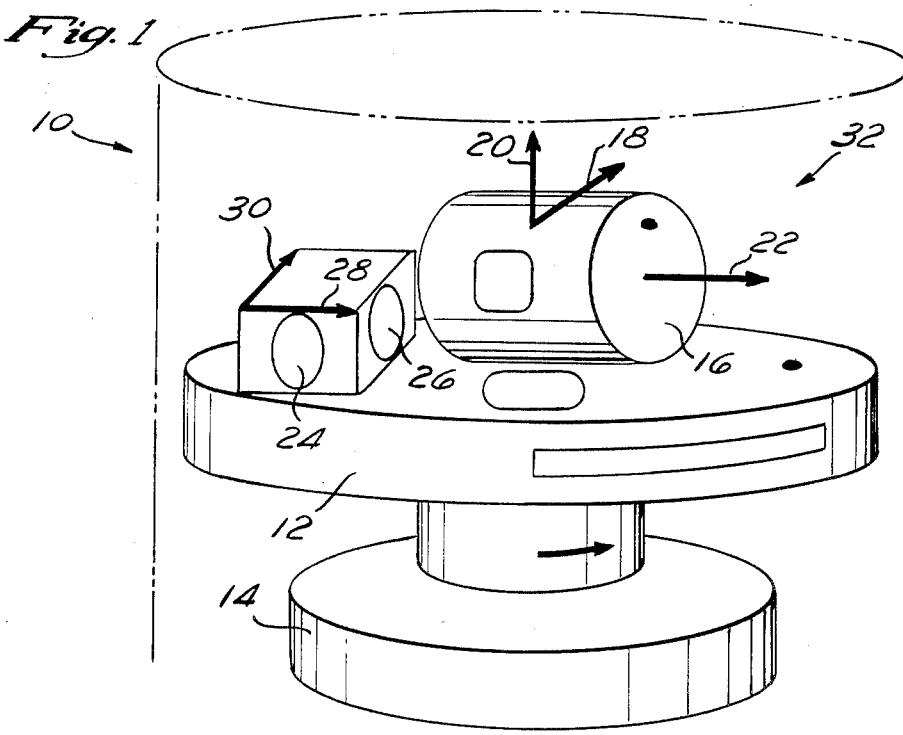
FIG. 1 is an elevational view of the vehicle land navigating device, including axes and rotation directional arrows, in a first embodiment of the invention, with adjacent inclinometers fixed to the flip table.
Figure 2:
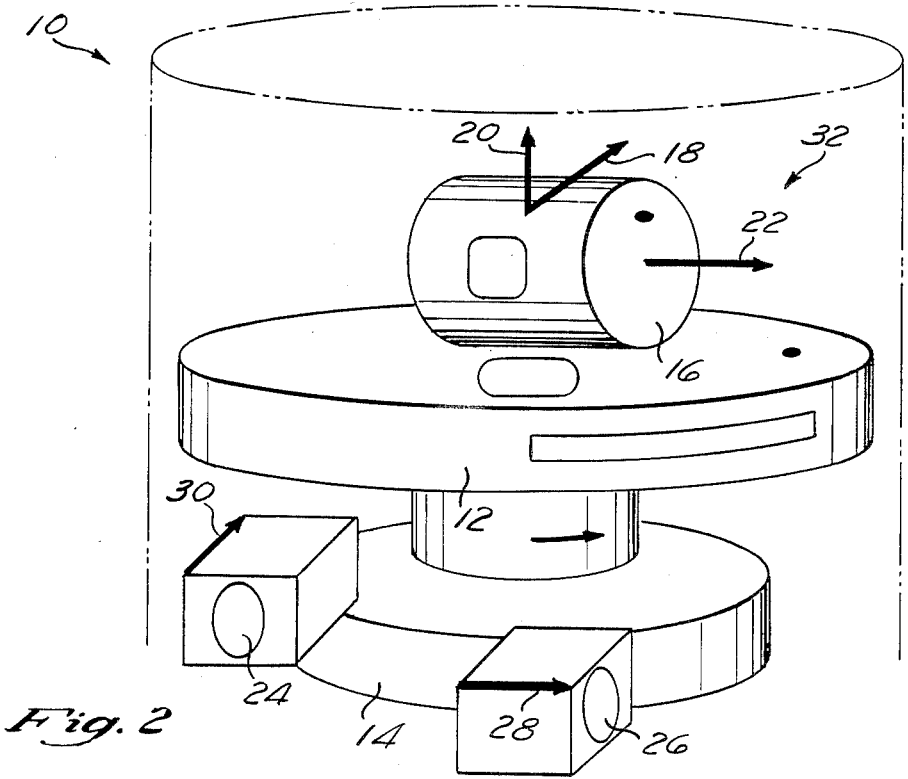
FIG. 2 is a similar view in a second embodiment of the invention, with separate inclinometers fixed to the vehicle body.
Figure 3:
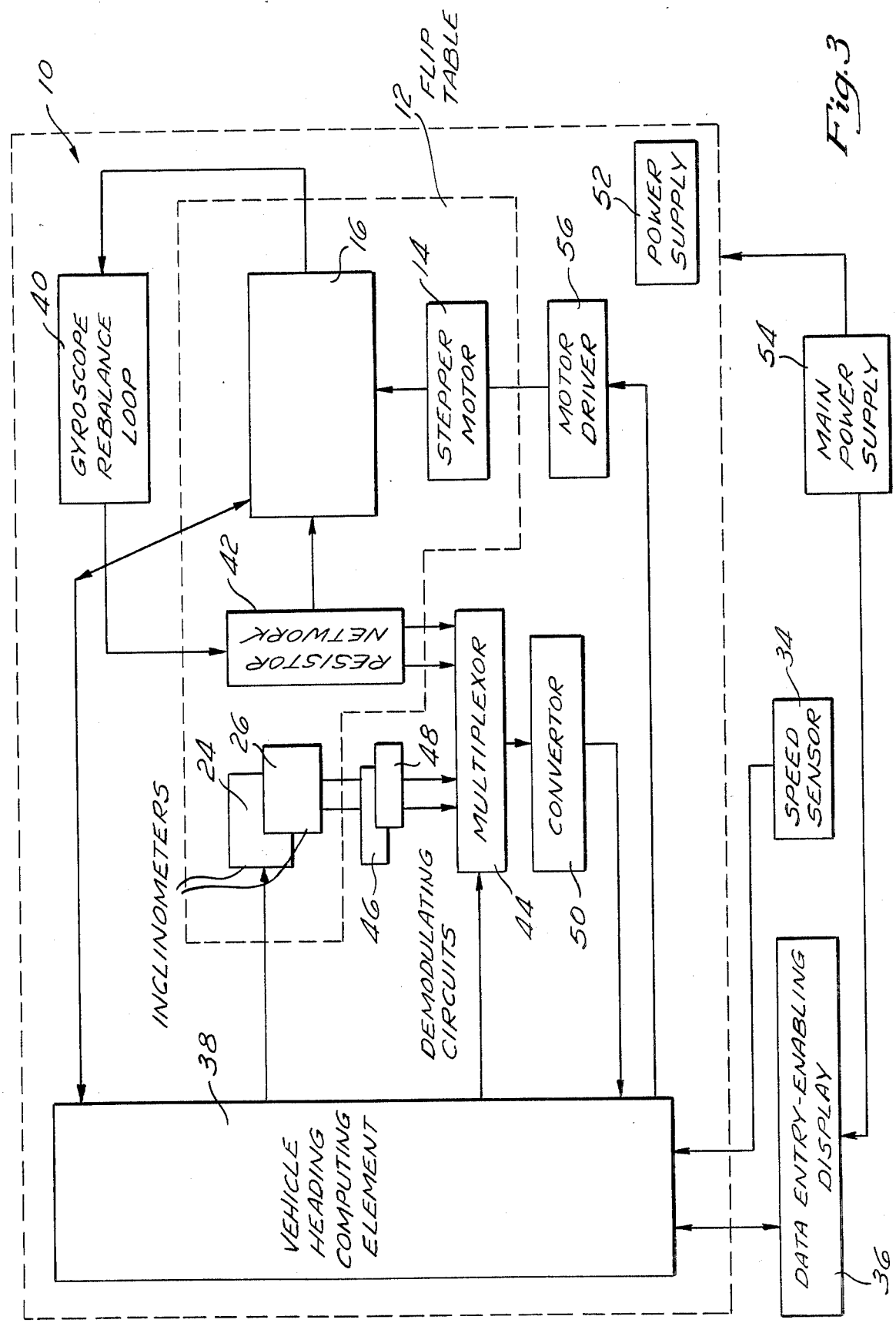
FIG. 3 is a block diagram of the elements of the invention.

Navigating device 10, as shown in FIGS. 1-3, includes an element for sensing heading and generating data to measure and update the vehicle heading. Such element includes a flip table 12, adapted to be rotated for sequencing through a series of positions as required for navigating. It further includes an element for rotating flip table 12, for sequencing thereof through the series of heading positions required, such as a high resolution stepper motor 14, having, for example, 200 steps per 360 degrees and also having a motor driver 56.

The heading sensing and data generating element further includes a gyroscope 16, adapted to be mounted on flip table 12 to rotate and yaw therewith, and to be rotated thereby through a sequence of positions to seek North and to calibrate the heading parameters. Gyroscope 16 is preferably of the dual-axis type which includes first and second degrees of freedom, defining a first sensitive axis 18, preferably horizontal for North-seeking, and a second sensitive axis 20, preferably vertical for navigating by updating the heading. Second sensitive axis 20 of gyroscope 16 is offset preferably ninety degrees from first sensitive gyroscope axis 18 thereof. The spin axis 22 of gyroscope 16 is shown in FIGS. 1 and 2.

The heading sensing and data generating element still further includes at least one inclinometer 24, and, in another embodiment as shown in FIGS. 1-3, a second inclinometer 26, which inclinometers 24 and 26 are adapted to define the pitch and roll axis of the vehicle body. Inclinometer 24 is adapted to define a first sensitive axis 28, and inclinometer 26 is adapted to define a second sensitive axis 30, offset, preferably ninety degrees, from first sensitive axis 28. Inclinometers 24 and 26 are adapted, in the preferred embodiment, to be mounted on flip table 12 for movement therewith, or alternatively, may be mounted to the vehicle body for movement therewith, as shown in FIG. 2.

The inclinometers, as 24 and 26, are preferably of the electrolytic level type, adapted to measure gravity through a resistance or capacitive bridge, by having a fixed volume of electrolytic fluid trapped in a larger volume symmetrical cavity with one central and two symmetrical electrodes.

Navigating device 10 further includes a housing 32 for supporting the heading sensing and data generating element. Housing 32 is adapted to be strapped down to the vehicle body for movement therewith.

An element 34 for sensing the speed of the vehicle and measuring the distance travelled is further included in navigating device 10, as shown in FIG. 3.

Navigating device 10 still further includes a data entry-enabling and displaying element 36, adapted to transmit and receive navigating data.

An element 38 is included in navigating device 10 for computing vehicle heading and position data from data generated upon sensing of the vehicle heading by the heading sensing and data generating element, from data generated upon sensing of the vehicle speed by the vehicle speed sensing element 34, and from data entered into the data-entry enabling element 36.

The circuit for navigating device 10, as shown in FIG. 3, further includes a gyroscope rebalance loop 40, connected to gyroscope 16 such that the output from gyroscope 16 is connected as the input thereto. Gyroscope rebalance loop 40 is adapted to amplify, demodulate, and filter the gyroscope pickoff signal and feed back such signal to the gyroscope torquers in gyroscope 16. Such signal feedback takes place through a precision power resistor network 42, to which the output from gyroscope rebalance loop 40 is connected, and from which the feedback output is connected to gyroscope 16.

Outputs from precision power resistor network 42 are connected as inputs to multiplexer 44, along with inputs from inclinometers 24, 26 through demodulating circuits 46, 48.

Outputs from vehicle heading computing element 38 are connected as inputs to data entry-enabling and display device 36, multiplexer 44, and gyroscope 16, and supply the excitation signals to inclinometers 24 and 26.

The output from multiplexer 44 is connected as the input to a converter 50, preferably of the voltage to frequency or analog to digital type. The outputs from gyroscope 16 and converter 50 are connected as inputs to computing element 38.

The navigating device further includes a power supply 52, which provides power to the sub-assemblies therein, and a main power supply 54 therefor and for the data entry-enabling and display device 36.

Figure 4:
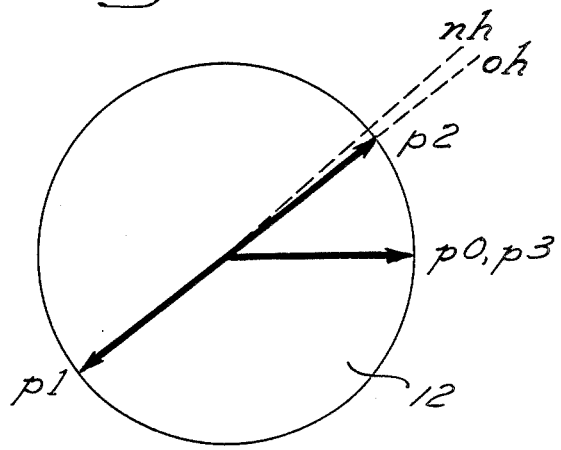
FIG. 4 is a geometric diagram of the North-seeking sequencing of the flip table for stored heading update.
Figure 5:
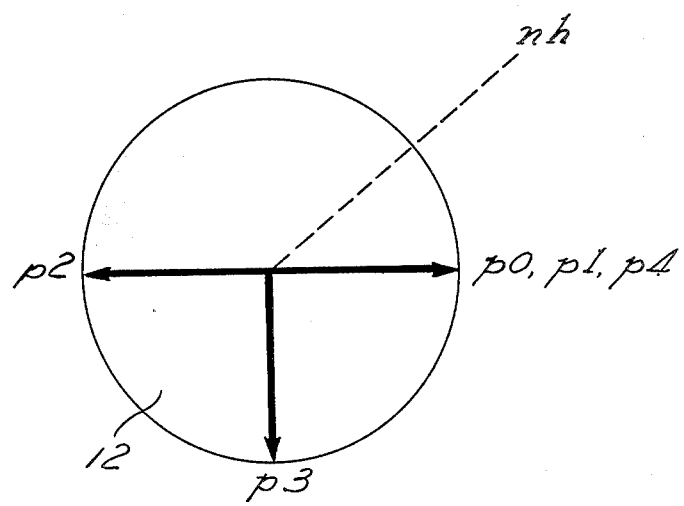
FIG. 5 is a similar view thereof for initial heading acquiring.

For North-seeking, two typical sequences are illustrated in FIGS. 4 and 5. The heavy arrows represent the spin axis 22 of gyroscope 16, which coincides with the zero position of flip table 12, being positioned at different heading angles by turning stepper motor 14. Flip table 12 is locked in position "0" (table heading), "p0" (gyroscope heading) while navigating, and vehicle heading computing element 38 continuously updates the vehicle heading.

In general, the North seeking process involves a number of angular positions of flip table 12, and thus also of the gyroscope spin axis 22 and the gyroscope first (horizontal) sensing axis 18 which are assumed to be all perfectly aligned. Since perfect alignment is not normally feasible, compensation therefor is preferably provided in the vehicle heading computing element 38. The formulas for calculation of gyroscope drifts are known such that it is assumed for purposes of explanation in the description below that the vehicle and flip table 12 are on a perfectly level surface. The outputs of inclinometers 24 and 26 would be used to compensate for non-level components of earth rate and gyroscope drifts. In operation, the device operates in two modes. North Seeking, while the vehicle is stationary, and Navigation, while the vehicle is either stationary or moving. During North Seeking the flip table is sequenced through a number of angular positions/drift measurements to find North, by aligning the gyroscope horizontal sensitive axis orthogonal to the horizontal component of Earth Rate. Navigation is achieved by using the means for sensing the speed of the vehicle in conjunction with the updated heading angle. The gyroscope's vertical sensitive axis output represents the heading rate of change and its integral is used to generate heading together with the initial heading found during the North Seeking. The vehicle speed times the cosine of the heading is used to update initial Northing coordinates and the vehicle speed times the sine of the heading is used to update the initial Easting coordinates.

For stored heading or heading update, as shown in FIG. 4, the initial position of flip table 12 is the locked position at "pO," while the calculated heading is at "oh." Flip table 12 may then be rotated to "p1," a point at "oh + 180 degrees." A measurement of the horizontal drift rate is then taken for ROTH1 according to the general formula:

$$\text{(1) ROTH} = \text{OMEGA} * \text{COS (LAMDA)} * \text{SIN (PSI)} + \text{BH} + \text{DBH} + \text{QUB} \quad (1)$$

where ROTH 1 is the first measured rate of turn in the horizontal axis, OMEGA is the earth rate = 360 degrees per day = 15.041 degrees per hour, LAMDA is the local latitude, PSI is the horizontal angle between the horizontal gyroscope axis and East or between spin and North, an unknown, BH is the bias horizontal, a gyroscope calibration parameter, DBH is horizontal run to run gyroscope drift, an unknown, and QUB is the quadrature unbalance, a gyroscope calibration parameter.

The flip table 12 is then rotated to "p2" which is identical to "oh," and a second measurement ROTH2 is taken pursuant to the above (1) general formula. The new updated heading "nh" is then calculated pursuant to the following formula:

$$\text{SIN (PSI)} = (\text{ROTH1} - \text{ROTH2})/2 \quad (2)$$

by adding PSI to the old heading "oh."

To update DBH, the horizontal run to run gyroscope drift, unknown, the following formula is used:

$$\begin{aligned}&\text{DBH (new)} = (\text{ROTH1} + \text{ROTH2})/2 - \text{BH} \\&\quad - \text{QUB} + \text{DBH (old)} \\&\text{[DBH (old) is zero for stored heading]}\end{aligned} \quad (3)$$

Since the arcsine function has two possible solutions, in some cases an additional third angle measurement is required to solve the ambivalence. Flip table 12 is then rotated to "p3" and locked, ready to navigate.

For initial North-seeking, as shown in FIG. 5, flip table 12 is in position "p0" when the system is switched on. A measurement ROTH1 is then taken at "p1" pursuant to formula (1) above. Flip table 12 is then rotated to "p2" at 180 degrees from "p0" and "p1," and a second measurement ROTH2 is taken likewise pursuant to formula (1) above. Flip table 12 is then rotated to "p3" and a third measurement ROTH3 is then taken further pursuant to formula (1) above. Finally, flip table 12 is rotated back to "p4" and locked, ready to navigate.

The new heading "nh" from initial North-seeking is calculated pursuant to the above formula (1) for ROTH1, and ROTH2, and ROTH3, and pursuant to the above formulae (2) for SIN (PSI) and (3) for DBH (new). ROTH3 may be used to determine the correct quadrants of PSI (arcsine ambivalence) and optionally to calculate latitude if needed. Latitude may also be calculated from the Northing and Easting inputs, or be input from the data entry enabling element 36.

For stored heading or heading update as shown in FIG. 4, or for initial North-seeking as shown in FIG. 5, if the resulting angle PSI is larger than a given threshold, the process may be repeated for a second iteration with the gyroscope spin axis close to North, so as to minimize scale factor sensitivities.

For navigating, the second vertical sensitive axis 30 of the gyroscope 16 is used for updating the heading found in North seeking pursuant to the following formulae:

$$\text{HEADING} = \text{HEADING (old)} - \text{ROTV average} * \text{TIME} + \text{compensation terms (non g sensitive, g and } g^2 \text{ sensitive)} \quad (4)$$

$$\text{ROTV} = \text{OMEGA} * \text{SIN (LAMDA)} + \text{BV} + \text{DBV} + \text{MUB} \quad (5)$$

where ROTV is the measured rate of turn in the vertical axis, OMEGA and LAMDA have been defined above, BV is the bias vertical, a gyroscope calibration parameter, DBV is the vertical run to run gyroscope drift, an unknown, and MUB is the mass unbalance, a gyroscope calibration parameter.

Flip table 12 and stepper motor 14 enable sequencing of dual-axis gyroscope 16 mounted thereon through the positions required for North seeking, parameter calibrating, and navigating in a manner which is substantially as accurate efficient and effective as, and significantly more economical than, gimballed mountings therefor.

Inclinometers 24 and 26 provide assistance in North seeking and parametric calibration in a manner substantially as accurate efficient and effective as, and significantly more economical than, accelerometer aiding thereof.

Preferred embodiments of the device of the invention have been set forth above, for the purpose of explaining the invention. However, it is to be understood that variations may be made in such embodiments, which variations are nevertheless within the scope and spirit of the invention as set forth in the claims herein.

I claim:

1. A vehicle land navigating device, adapted to measure and update vehicle heading by North-seeking and navigating, comprising:
    (a) means for sensing vehicle heading and for generating vehicle heading measuring and updating data, comprising:
        (1) a flip table, adapted to be rotated so as to sequence through a series of angular positions and drift measurements to find North;
        (2) means for rotating the flip table so as to sequence the flip table through the series of heading positions;
        (3) a gyroscope, of the dual-axis type, adapted to have a first degree of freedom defining a first generally horizontal sensitive axis for North-seeking by aligning the gyroscope generally horizontal sensitive axis orthogonal to the horizontal component of the Earth Rate, and a second degree of freedom defining a second generally vertical sensitive axis for navigating, offset from the first sensitive axis, the output from which represents the heading rate of change, which gyroscope is further adapted to be mounted on the flip table to rotate therewith and to be rotated thereby through a sequence of heading positions to seek North and calibrate the gyroscope parameters including the horizontal axis drift and vertical axis drift and the vertical axis scale factor; and
        (4) an inclinometer, adapted to be mounted on the flip table for movement therewith and to define the pitch or roll axis of the vehicle body depending on the flip table position;
    (b) a housing for supporting the heading sensing and data generating means, adapted to be strapped down to the vehicle;
    (c) means for sensing the speed of the vehicle for navigating in conjunction with the updated heading angles for the Northing coordinates generated by the vehicle speed times the cosine of the heading, and for Easting coordinates generated by the vehicle speed times the sine of the heading;
    (d) means for enabling entry of data including coordinates, latitude, and map information; and
    (e) means for computing vehicle heading data from the heading sensed and data generated in the heading sensing and data generating means, including the inclinometer, temperature of the gyroscope, and the angle of the flip table, and in the speed sensing means, and from information entered in the data entry enabling means by coordinating the integral of the heading rate of change with the initial heading found during North seeking.

2. A device as in claim 1, further comprising means for displaying the data computed in the vehicle heading computing means.

3. A device as in claim 1, in which the flip table rotating means comprise a high resolution stepper motor.

4. A device as in claim 3, in which North-seeking is performed in two iterations of the vehicle heading computing means, and in which the second iteration is performed with the gyroscope spin axis close to North.

5. A device as in claim 1, in which the gyroscope comprises first and second single axes gyroscopes.

6. A device as in claim 1, in which the inclinometer comprises a first inclinometer adapted to define a first sensitive axis, and in which the device further comprises a second inclinometer adapted to define a second sensitive axis, offset from the first sensitive axis, and in which the first and second sensitive axes sense the pitch and roll of the vehicle respectively.

7. A device as in claim 6, in which the first and second inclinometers are adapted to be mounted on the flip table for movement therewith.

8. A device as in claim 6, in which the first and second inclinometers are adapted to be mounted to the vehicle for movement therewith.

* * * * *